June 16, 1964 L. V. WHISTLER, SR., ETAL 3,137,193
PUNCH AND DIE MOUNTING DEVICE
Filed Nov. 4, 1960 2 Sheets-Sheet 1
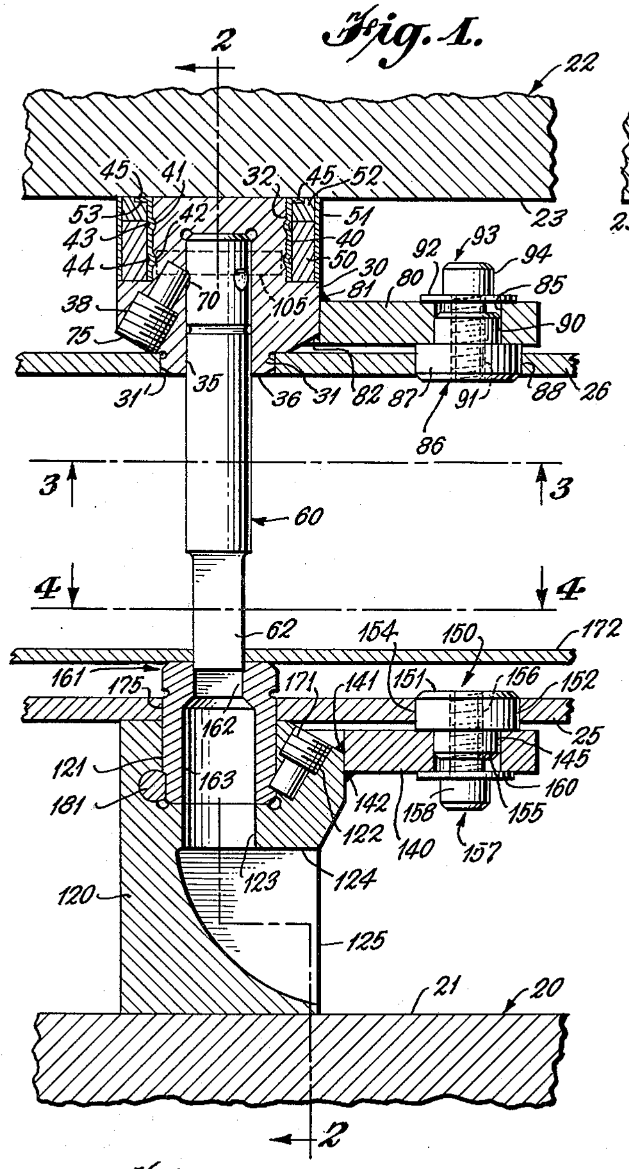
Fig. 1.
Fig. 2.
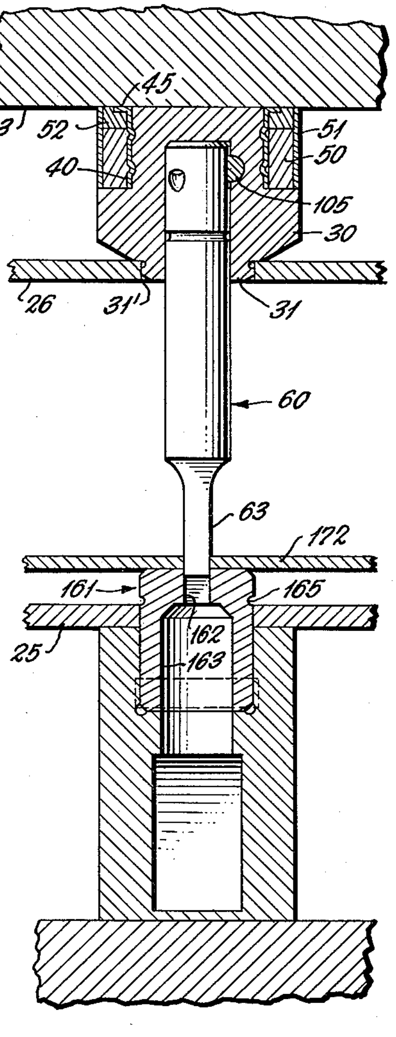
Fig. 11.
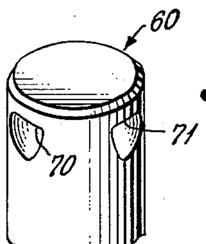
Fig. 8.
Fig. 12. Fig. 13.
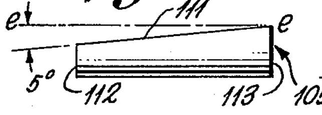
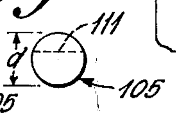
INVENTORS
Lawrence V. Whistler, Sr.
Lawrence V. Whistler, Jr.
By Shoemaker and Mattare
ATTORNEYS INVENTORS
Lawrence V. Whistler, Sr.
Lawrence V. Whistler, Jr.
By Shoemaker and Mattare
ATTORNEYS 3,137,193
Patented June 16, 1964

3,137,193

PUNCH AND DIE MOUNTING DEVICE

Lawrence V. Whistler, Sr., 259 Doncaster Road, and Lawrence V. Whistler, Jr., 251 Doncaster Road, both of Kenmore, N.Y.

Filed Nov. 4, 1960, Ser. No. 67,303
4 Claims. (Cl. 83—685)

The present invention relates to new and novel punch and die mechanism and more particularly to mechanism which is particularly adapted for punching non-circular openings in sheet metal workpieces and the like.

The present invention represents an improvement over our copending patent application Ser. No. 790,087 filed January 30, 1959, now Patent Number 3,089,376 of May 14, 1963, wherein there is disclosed a novel punch and die assembly wherein the punch and die retainers are readily adapted to be adjusted in various positions upon the associated punch and die shoes. As set forth in the above-mentioned copending application, the punch retainer mechanism is retained by magnetic means in position on the punch shoe. In addition, template means is provided for accurately positioning the punch retainers as well as the die retainers, the die retainers being further provided with resilient means which engages the die template for preventing turning of the die retainers once they have been assembled in operative position in a punch and die set.

When it is desired to punch out non-circular holes in sheet metal and the like, a particular problem arises in providing the necessary true and accurate register of the punch and die members with respect to one another. In other words, the punch as well as the die must be perfectly aligned with one another in order to obtain the desired end results and to ensure longevity of the useful life of the punch and die members.

It is accordingly a particular feature of the present invention to provide an improved means for positively and accurately aligning the punch member with respect to its associated punch retainer as well as providing a similar means for obtaining positive and accurate alignment of the die bushing with respect to its associated die retainer. In addition, means is provided for positively and accurately positioning the punch and die retainers themselves with respect to associated punch and die templates.

This latter mentioned accurate positioning of the punch and die retainers with respect to the associated templates is obtained by providing in each template a pair of openings of different dimension for each associated retainer, the retainer including at least one portion adapted to snugly fit within one of said openings, the overall construction being such that each retainer can only be assembled in one manner with respect to the associated template. Accordingly, it is impossible to associate the retainers with the associated templates in any other than the proper manner.

The present invention also incorporates a most unique construction for obtaining accurate and positive alignment of the punch and die member with respect to its associated retainer. In both the punch and die retainers, a longitudinally extending hole is provided for receiving a punch or die bushing as the case may be. Each retainer also includes a transversely extending opening formed therein which is of substantially constant diameter. This opening has a longitudinal axis which is disposed at an acute angle to a plane passing through the longitudinal axis of the aforementioned hole. A pin is positioned within this opening and has a substantially cylindrical configuration of substantially the same size as the opening. This pin also has formed along one side thereof a flat which forms an acute angle with respect to a plane extending parallel to the longitudinal axis of the pin, and intersecting the outer periphery of the pin. This last-mentioned acute angle is substantially identical with the first-mentioned acute angle such that the overall effect is to provide a flat surface against which cooperating surfaces formed on a punch or die bushing may abut to provide accurate alignment of the punch or die bushing. Means is also provided in association with each of the retainers for securing the punch or die bushing in place as the case may be. The flat surfaces formed on the punch or die bushing are so related to the shape of the terminal end of the punch and the shape of the opening formed in the die bushing for receiving the punch that the punch and die bushing will thereby be properly accurately aligned with one another for perfect registration during operation of the punch and die mechanism.

An object of the present invention is to provide a new and novel punch and die mechanism including means for accurately positioning punch and die retainers with respect to one another in a die set.

Another object of the invention is the provision of means for accurately and positively positioning a punch within a punch retainer.

A further object of the invention is to provide means for accurately and positively positioning a die bushing in a die retainer.

A still further object of the invention is to provide punch and die mechanism which is quite simple and inexpensive in construction and yet which is accurate and reliable in operation.

Other objects and many attendant advantages of the present invention will become more apparent when considered in connection with the specification and accompanying drawings, wherein:

FIG. 1 is a longitudinal section taken through a punch and die set incorporating the present invention;

FIG. 2 is a sectional view taken substantially along line 2—2 of FIG. 1, looking in the direction of the arrows;

FIG. 8 is a perspective view of the opposite side of the top end portion of the punch shown in FIG. 6;

FIG. 11 is a top view of a pin utilized in the present invention;

FIG. 12 is an elevation of the pin shown in FIG. 9;

FIG. 13 is an end view of the pin shown in FIG. 12.

Figure 3:
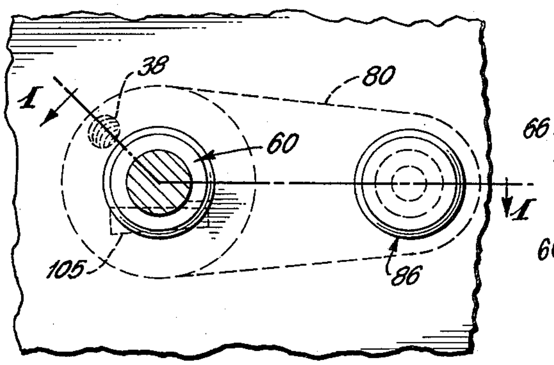
FIG. 3 is a view taken along line 3—3 of FIG. 1 looking in the direction of the arrows.

Referring now to the drawings wherein like reference characters designate corresponding parts throughout the several views, there is illustrated in FIGS. 1 and 2 a die set incorporating the present invention and including a die shoe 20 having an upper surface 21 and spaced thereabove is a punch shoe 22 having a lower surface 23. It will be understood that the punch shoe 22 is mounted for reciprocatory movement toward and away from the die shoe 20 in a conventional manner, a suitable guide means (not shown) being provided for guiding the movement of the punch shoe relative to the die shoe during operation of the apparatus.

The punch and die shoe as well as the template support means may be of relatively conventional construction such as shown in our aforementioned copending application, a die template 25 being supported adjacent the die shoe 20, and a punch template 26 being supported adjacent the punch shoe 22. It is of course understood that the punch and die templates are provided with openings therein for properly aligning the punch and die retainers.

The magnetic punch retainer which is magnetically adhered to the under surface 23 of the punch shoe comprises a body portion 30 having a substantially annular collar 31 of reduced diameter formed at one end portion thereof, and a groove 32 formed in the outer surface at the opposite end portion thereof. Collar portion 31 is ground to a predetermined dimension such that it is adapted to be snugly received within an opening 31' of substantially the same dimension provided through punch template 26.

A longitudinally extending punch receiving hole 35 is formed in the body and opens at the lower surface 36 of the punch retainer. This opening 35 is ground to a fine tolerance such that all punches of like diameter may be interchangeable in the punch retainer. An obliquely extending threaded opening 38 is provided in the side portion of the body means and opens obliquely into hole 35, opening 38 receiving a set screw as hereinafter described.

An inner non-magnetic sleeve 40 is mounted on the inner portion of groove 32 and is formed of a suitable non-magnetic substance such as brass, aluminum, and similar material, whereas the body portion 30 of the punch retainer is formed of a good magnetic conductor such as an alloy steel or the like, or of a material that can be hardened throughout the entire body and still have a great amount of impact strength to withstand the constant pounding of the head of a punch inserted within the cylindrical opening 35.

In order to retain sleeve 40 firmly in position within groove 32, two circumferentially extending depressions 41 and 42 are provided around the upper end portion of the body, sleeve 40 including deformed portions 43 and 44 seated in grooves 41 and 42 respectively. The upper end 45 of the inner sleeve 40 is spun or flanged over for a purpose hereinafter described.

A permanent magnet 50 of substantially annular configuration is disposed in surrounding relationship to inner sleeve 40, the magnet being of a relatively powerful permanent type such as a magnet identified as Alnico #5. An outer shielding sleeve 51 is disposed in surrounding relationship to magnet 50 and is substantially flush with the outer surface of body 30. It is evident that magnet 50 is retained in operative position between sleeves 40 and 51.

A core member 52 formed of a suitable magnetically conductive substance such as cold rolled steel is of substantially annular configuration and is disposed between sleeves 40 and 51, and abuts the upper end of magnet 50. Core 52 is provided with a circumferentially extending groove 53 formed on the upper inner surface thereof for receiving the turned over end portion 45 of sleeve 40. It is evident that the turned over end portion 45 of sleeve 40 retains the core member 52 in abutting relationship with magnet 50 and urges the magnet into contact with body portion 30.

The magnetic field generated by permanent magnet 50 in cooperation with the described structural arrangement of the punch retainer provides firm magnetic adhesion between the punch retainer and the punch shoe.

As seen in FIG. 1, a punch indicated generally by reference numeral 60 is shown as received within the punch receiving opening 35 of the punch retainer, the punch having a substantially cylindrical body portion which is rather snugly received within cylindrical hole 35.

Figure 6:
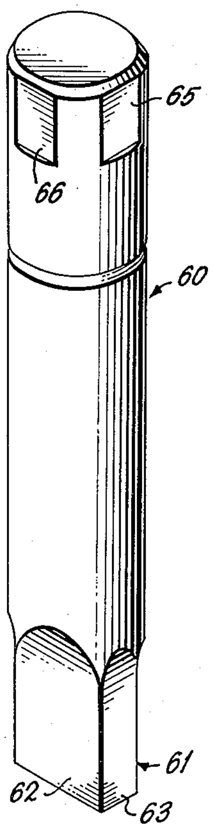
FIG. 6 is an enlarged perspective view of a punch utilized in the present invention.
Figure 7:
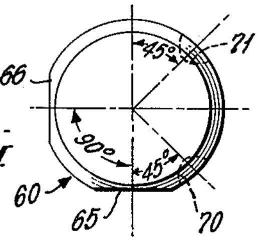
FIG. 7 is a top end view of the punch shown in FIG. 6.

The punch is shown in more detail in FIGS. 6, 7 and 8, and as seen in FIG. 6, it will be noted that the lower terminal end portion 61 of the punch is so configured as to be of a substantially rectangular configuration including a first face 62 having a substantially greater dimension than the face 63 extending at right angles thereto. It is accordingly clear that this punch is adapted to punch out rectangular openings rather than circular which presents one of the major problems solved by the present invention.

As seen particularly in FIGS. 6 and 7, the upper end portion of the punch 60 is provided with first and second flat surfaces 65 and 66 which are adapted to assist in properly aligning the punch with respect to its associated punch retainer. It will be noted that flat surface 65 is disposed parallel to a plane passing through face 63 or the smaller dimension of the terminal end 61 of the punch, while the flat surface 66 is disposed parallel to a plane passing through the face 62 or the greatest transverse dimension of the terminal end 61 of the punch. Accordingly, the flat surfaces 65 and 66 are adapted to align the punch with its associated punch retainer in a predetermined interrelationship to the greater and lesser dimensions of the operating terminal end portion of the punch.

As seen most clearly in FIGS. 7 and 8, the upper end portion of punch 60 is also provided with a pair of notches 70 and 71, the notches being in a predetermined angular relationship with respect to the flat surfaces 65 and 66. It will be noted that notch 70 is spaced angularly 135° with respect to the flat surface 66 while the notch 71 is spaced angularly 135° with respect to the flat surface 65.

As will appear hereinafter, this angular relationship permits the punch to be held in position by a securing means engaged in notch 70 while the surface 66 of the punch engages the positioning means of the punch retainer, while on the other hand, the securing means engages notch 71 for retaining the punch in operative positon when the flat surface 65 engages the positioning means incorporated in the punch retainer.

Referring again to FIG. 1 of the drawings, it will be seen that when the punch 60 is disposed in operative position, a set screw 75 is threaded within obliquely extending opening 38, the upper reduced end portion of set screw 75 engaging in one of the notches of the punch.

The punch retainer also includes a laterally extending extension 80 which is suitably secured to the body portion 30 as by electric brazing as indicated by reference numerals 81 and 82. As can be seen best in FIGS. 3 and 5, extension 80 includes an arcuate surface which fits snugly about the outer periphery of the cylindrical body portion 30 thereby permitting these members to be effectively attached to one another.

An opening 85 is provided through extension 80, the longitudinal axis of opening 85 being disposed parallel with the longitudinal axis of hole 35 of the puch retainer. A plug member indicated generally by reference numeral 86 includes an enlarged head portion 87, the outer diameter of which is ground to fit snugly within an opening 88 of substantially the same size formed in the punch template 26. It should be noted that the diameter of opening 88 is less than that of the opening 31' which is also formed in the punch template, and accordingly, the punch retainer shown in FIG. 1 can only be inserted in operative position in the particular relationship shown due to the difference in dimensions of the openings 31' and 88 formed in the punch template.

Member 86 also includes a reduced cylindrical portion 90 which snugly fits within opening 85 of the extension of the punch retainer. A threaded bore 91 extends longitudinally through plug member 86.

A washer 92 engages the upper surface of extension 80 of the punch retainer and has a central opening formed therein which receives the threaded shank portion of a bolt 93 having an enlarged head 94 formed thereon. The threaded shank of bolt 93 is threaded into the threaded bore of plug member 86 and in this manner, the plug member is retained in operative position relative to the punch retainer.

The means for positively and accurately positioning a punch within the punch retainer will now be described.

Figures 5, 9:
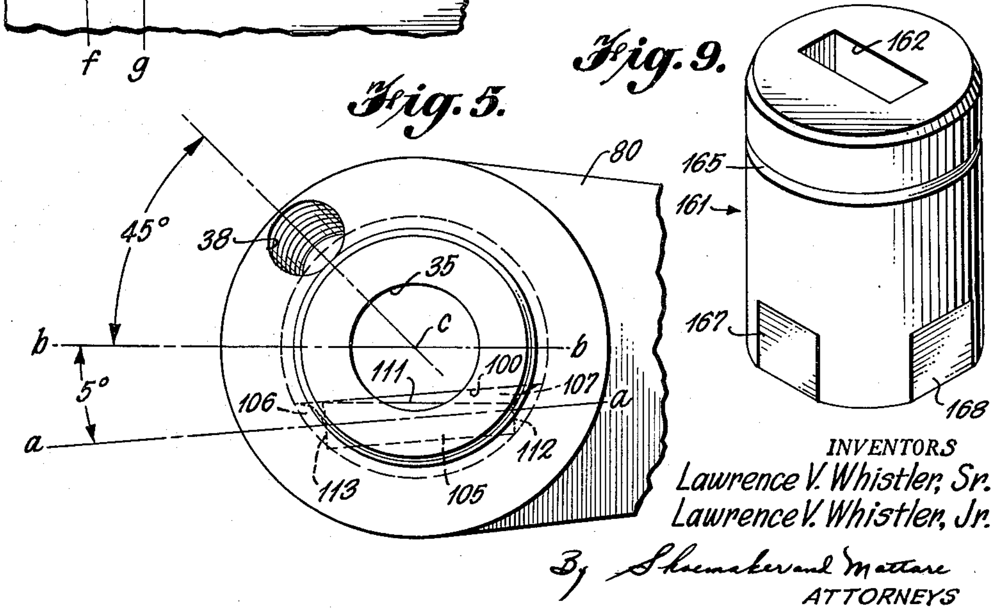
FIG. 5 is an enlarged bottom view partly broken away of the punch retainer according to the present invention.
FIG. 9 is an enlarged perspective view of a die bushing employed in the present invention.

This structure can be most clearly seen in FIGS. 3 and 5, and as seen most especially in FIG. 5, a transversely extending opening 100 is formed through the body portion 30 of the punch retainer, this opening having a longitudinal axis indicated by phantom line *aa* in FIG. 5. Phantom line *bb* in FIG. 5 indicates a plane passing through the longitudinal axis *c* of the hole 35 formed in the punch retainer. It will be understood that since hole 35 in the punch retainer is cylindrical in configuration, the plane *bb* in FIG. 5 also passes through the diameter of the hole. In cases where hole 35 may be other than circular in cross-section, reference will still be made to a plane passing through the longitudinal axis of the punch receiving hole in the punch retainer.

As seen in FIG. 5, the longitudinal axis of opening 100 is not parallel with the plane indicated by line *bb*, but rather is disposed at an acute angle thereto which as illustrated in FIG. 5 may be for practical purposes an angle of about 5°. This angle may be varied slightly, and it is considered that angles such as 6° or 7° will also be feasible, although a 5° angle is considered to be the most practical at the present time. Opening 100 is formed completely through the body means, a pin 105 being disposed within the opening and secured in operative position therein, as shown, by means of spot-brazing as indicated by reference numerals 106 and 107, this spot-brazing being utilized for attaching the opposite end portions of the pin to the adjacent walls of the opening 100 for permanently securing the pin 105 in position.

Referring to FIGS. 11, 12 and 13, a pin 105 as employed in the present invention is illustrated. Firstly, it should no noted that the pin is provided with a diameter indicated by *d* which is substantially the same as that of opening 100 formed in the punch retainer such that the pin is adapted to be relatively snugly received within opening 100. The pin is provided with a flat 111 along one side thereof, it being noted that this flat extends from a first end portion 112 of the pin and tapers to the opposite end portion 113 of the pin. As indicated in FIG. 12, flat 111 forms an acute angle with respect to a plane extending parallel with the longitudinal axis of the pin and intersecting the outer periphery of the pin, this plane being indicated by a line *ee*. This acute angle is so designed as to be substantially identical to the acute angle as discussed in connection with FIG. 5 and in the illustrated example, these acute angles are 5°.

As a result of this construction, when the pin 105 is inserted in operative position within the opening 100 as seen particularly in FIG. 5, the flat 111 formed thereon will lie in a plane which extends substantially parallel to the aforementioned plane passing through the longitudinal axis of the hole 35. Accordingly, one of the flats 65 or 66 on punch 60 is adapted to abut snugly against the flat 111 formed on the pin when the pin is disposed in operative position.

The advantage of this particular pin construction is the fact that when originally assembling the punch retainer, the opening 100 is first formed therethrough, and then when the opening 85 is being formed through extension 80, a master corresponding to a punch is inserted within hole 35, and the pin 105 moved into final position against the master, whereupon the pin is electrically brazed or held in place by other means.

In this manner, a positive positioning of the flat of the pin can be obtained with respect to the remaining components of the punch retainer.

As seen in the lower portions of FIGS. 1 and 2 of the drawings, the die retainer is illustrated and comprises a body 120 of substantially circular cross-section, the body having a die receiving hole or socket 121 formed in the upper surface thereof and extending longitudinally thereof for receiving a die bushing. An obliquely extending threaded opening 122 is in communication with the lower portion of opening 121, and is adapted to receive a set screw as hereinafter described. The lower portion of opening 121 is in communication with a central opening 123 of reduced diameter which in turn communicates with a laterally extending passage 124 which opens at 125 in the lateral portion of the die holder. Passage 124 is adapted to receive and guide slugs outwardly of the die retainer when such slugs have been punched from a piece of associated work material.

The die retainer is preferably made of a substance such as alloy steel which is hardened to withstand the wear and tear encountered in use, the hole 121 being ground to a fine tolerence so as to enable various die bushings to be inserted therein and accurately located.

A lateral extension 140 is connected as by welding or brazing as indicated at 141 and 142 to the body portion 120 of the die retainer. Lateral extension 140 is provided with an opening 145 extending therethrough and having a longitudinal axis which is disposed substantially parallel to the longitudinal axis of hole 121 formed in the die retainer.

A plug indicated generally by reference numeral 150 is provided with an enlarged head 151 which is snugly received within an opening 154 formed in the die template. Plug 150 also includes a reduced cylindrical portion 155 which is snugly received within opening 145 in the die retainer extension 140. A threaded bore 156 is provided through plug 150, and a threaded bolt 157 is threadedly received within bore 156. Bolt 157 has an enlarged head 158 which bears against a washer 160. It is evident that bolt 157 maintains the plug 150 in assembled position as shown.

Figure 10:
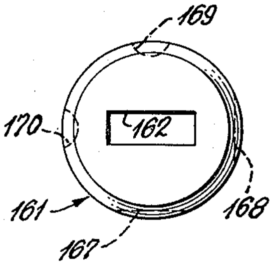
FIG. 10 is a top end view of the die bushing shown in FIG. 9.

A die bushing 161 is shown as mounted in the hole or socket 121 in FIGS. 1 and 2, and the die bushing is illustrated in more detail in FIGS. 9 and 10. As seen in these figures, the die bushing has a substantially cylindrical outer configuration, and an opening 162 is formed through the upper portion thereof, this opening being complementary in shape to the lower terminal end portion of the punch for receiving such portion of the punch in a well-known manner. This opening 162 communicates with an enlarged bore portion 163 as seen in FIGS. 1 and 2, which extends longitudinally through the die bushing.

An annular groove 165 is formed in the outer surface of the die bushing, this groove being for the purpose of receiving a snap ring therein to assist in initially assembling the die bushings and die retainers with respect to the die template.

Also formed on the outer surface of the die bushing at the lower end portion thereof as seen in FIG. 9 are a pair of flat surfaces 167 and 168, these flat surfaces being disposed at substantially right angles to one another and lying in planes which are parallel to the major and minor dimensions of the opening 162 formed through the opposite end portion of the die bushing.

As seen in FIG. 10, a pair of notches 169 and 170 are formed in the outer surface of the die bushing at the lower end portion thereof at diametrically opposite portions of the bushing from the flat surfaces 167 and 168 respectively.

Referring again to FIG. 1, it will be noted that when the die bushing is disposed in operative position, it may be retained in place by a set screw 171 which is threaded in the opening 122 with the reduced end portion of set screw 171 engaged in one of the notches formed in the die bushing.

As seen in FIGS. 1 and 2, a workpiece 172 is illustrated as being supported on the upper surfaces of the die bushings, and the punch has been illustrated as having already pierced the workpiece and as extending slightly into the opening 162 provided in the die bushing. It will also be noted as seen in FIGS. 1 and 2 that the outer surface of die bushing 161 is snugly received within an opening 175 formed in the die template 26. The dimension of opening 175 is greater than that of opening 152 formed in the die template, and accordingly, it is only possible to assemble the die retainer in one particular position with respect to the die template. It will accordingly be understood that the openings provided in both the punch template and the die template serve to positively and accurately position the punch retainer and die retainer with respect to one another, and, of course, these openings can be placed in any selected position to provide the desired arrangement of the punch and die retainers with respect to one another.

Figure 4:
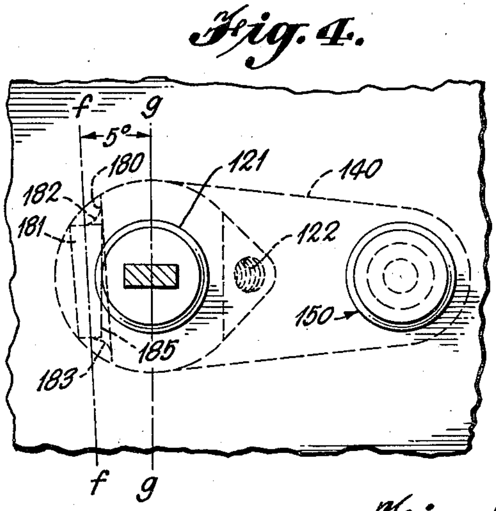
FIG. 4 is a view taken along line 4—4 of FIG. 1 looking in the direction of the arrows.

Referring now to FIG. 4 of the drawings, the particular means for positively and accurately aligning the die bushing with respect to the die retainer is illustrated. This arrangement is in fact quite similar to that discussed in connection with the positioning means of the punch retainer, and accordingly, the description of this arrangement will be relatively brief since it will be understood that the overall concept and general construction of the arrangement incorporated in the die retainer is the same as that of the punch retainer.

As seen in FIG. 4, a transversely extending opening 180 is provided through the body portion 120 of the die retainer, and a pin 181 is disposed within this opening and suitably secured in position as by brazing or the like as indicated at 182 and 183. In this case, the longitudinal axis of the opening 180 is indicated by line *ff* and a plane passing through the longitudinal axis of hole 121 formed in the die retainer is indicated by line *gg*.

It will be noted that as seen in FIG. 4, the longitudinal axis of the opening 180 is disposed at an acute angle to a plane passing through the longitudinal axis of the hole formed in the die retainer, and this acute angle is again illustrated as being 5°, although slight variations are quite permissible. It will also be understood that the pin 181 is identical in construction with the pin as illustrated in FIGS. 9–11. Accordingly, pin 181 is also provided with a flat 185 which is formed at an acute angle of 5° in the present example with respect to a plane extending parallel with the longitudinal axis of the pin and intersecting the outer periphery of the pin. It will therefore be apparent that the flat 185 of the pin 181 of the die retainer lies in a plane which extends substantially parallel to the aforementioned plane indicated by line *gg* which passes through the longitudinal axis of the hole formed in the die retainer.

When the die bushing is inserted in position within the die retainer, one of the flat surfaces 167 or 168 is disposed in abutting relationship with the flat 185 formed on pin 181, and accordingly, the bushing is positively and accurately positioned within a die retainer. The set screw 171 is then inserted in place and engaged within either notch 169 or 170 as the case may be.

It will, of course, be understood that the punch and die bushing may be adjusted in either of two positions disposed at 90° to one another, and the punch and die bushing in each instance will be so adjusted that the opening of the die bushing is so located as to receive the lower terminal end portion of the punch.

It is apparent from the foregoing that there is provided new and novel punch and die mechanism including means in the form of a plurality of different sized openings formed in both the punch and die templates for accurately positioning punch and die retainers respectively in relation to one another. Unique means is also provided for accurately positioning the punch in the punch retainer as well as for positioning the die bushing in the die retainer. The overall construction is quite simple and inexpensive and yet is quite accurate and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form there functional as well as conjointly cooperative equivalents are therefore intended to be embraced by those claims.

We claim:

1. Punch and die mechanism comprising a punch shoe and a spaced die shoe, said shoes being mounted for movement with respect to one another, a punch retainer adjustably supported by said punch shoe, a die retainer adjustably supported by said die shoe, first template means supported adjacent said punch shoe for accurately positioning said punch retainer, second template means supported adjacent said die shoe for accurately positioning said die retainer, said first template having a pair of openings formed therethrough of different dimension, said punch retainer having a pair of spaced portions of different dimensions received within said openings in the first template, said second template having a pair of spaced openings formed therethrough of different dimension, said punch retainer having a punch-receiving hole formed therein and extending longitudinally thereof, said die retainer having a die-receiving hole formed therein and extending longitudinally thereof, each of said retainers having a transversely extending opening formed therein of substantially constant diameter, each of said openings having a longitudinal axis extending at an acute angle to a plane passing through the longitudinal axis of a hole of the respective retainer, a substantially cylindrical pin fixedly and permanently secured in an accurately determined particular position within each of said openings and having a flat formed thereon at an acute angle to a plane extending substantially parallel to the longitudinal axis of the pin and intersecting the outer periphery of the pin, said flat formed on each of said pins being presented to the interior of the hole of the associated retainer, a punch disposed within the hole formed in the punch retainer and having a flat there on and extending longitudinally from one end thereof abutting the flat of the pin supported by the punch retainer, means for retaining the punch in operative position relative to the punch retainer, a die bushing received within the hole in said die retainer and having a flat formed thereon and extending longitudinally from one end thereof, said last-mentioned flat abutting the flat of the pin supported by the die retainer, means for retaining the die bushing in operative position relative to the die retainer, said die bushing having a first outer dimension and a portion of said die retainer having a different outer dimension, said die bushing and said portion of the die retainer being received within said opening in the second template, whereby the punch and die retainers are accurately positioned with respect to one another.

2. Apparatus as defined in claim 1, wherein said punch and said die bushing each have a plurality of flats formed thereon whereby the angular position of the punch and die bushing may be adjusted with respect to the associated retainer.

3. Punch and die mechanism comprising a pair of spaced supports movable toward and away from one another, a punch retainer supported by one of said supports and a die retainer supported by another of said supports, each of said retainers being adjustably mounted with respect to the associated support, means for accurately positioning said retainers with respect to one another, said punch retainer having a punch receiving hole formed therein and extending longitudinally thereof, a die retainer having a die receiving hole formed therein and extending longitudinally thereof, each of said retainers having a transversely extending opening formed therein and being in communication with the longitudinally extending hole of the associated retainer, a pin fixedly and permanently secured in an accurately determined particular position within each of said laterally extending openings, each of said pins having a flat formed thereon, said flat facing and being in communication with the longitudinally extending hole of the associated retainer, and being adapted to abut a flat formed on a member received in the hole of the associated retainer, a punch received within the punch receiving hole of the punch retainer, said punch having a flat formed on the outer surface thereof and extending longitudinally from one end thereof abutting the flat formed on said pin of the punch retainer for accurately positioning the punch with respect to the punch retainer, and means for retaining said punch in operative position with respect to the punch retainer.

4. Punch and die mechanism comprising a pair of spaced supports movable toward and away from one another, a punch retainer supported by one of said supports and a die retainer supported by another of said supports, each of said retainers being adjustably mounted with respect to the associated support, means for accurately positioning said retainers with respect to one another, said punch retainer having a punch receiving hole formed therein and extending longitudinally thereof, a die retainer having a die receiving hole formed therein and extending longitudinally thereof, each of said retainers having a transversely extending opening formed therein and being in communication with the longitudinally extending hole of the associated retainer, a pin fixedly and permanently secured in an accurately determined particular position within each of said laterally extending openings, each of said pins having a flat formed thereon, said flat facing and being in communication with the longitudinally extending hole of the associated retainer, and being adapted to abut a flat formed on a member received in the hole of the associated retainer, a die bushing positioned within said die receiving hole of the die retainer, said bushing having a flat formed thereon and extending longitudinally from one end thereof, said last-mentioned flat abutting the flat of the pin of the die retainer, and means retaining said die bushing in operative position with respect to said die retainer.

References Cited in the file of this patent

UNITED STATES PATENTS

| | | |
|---|---|---|
| 688,860 | Kay et al. | Dec. 17, 1901 |
| 2,346,925 | Lewis | Apr. 18, 1944 |
| 2,364,401 | Stellin | Dec. 5, 1944 |
| 2,364,834 | Whistler et al. | Dec. 12, 1944 |
| 2,373,962 | Joachimi | Apr. 17, 1945 |
| 2,700,549 | Cornett | Jan. 25, 1955 |
| 2,732,015 | Whistler et al. | Jan. 24, 1956 |
| 2,801,859 | Kopczynski | Aug. 6, 1957 |

FOREIGN PATENTS

| | | |
|---|---|---|
| 271,953 | Great Britain | June 7, 1927 |